June 18, 1968    J. G. JOHNSON    3,388,559

ELECTRIC MOTORS COOLED WITH REFRIGERANTS

Filed Dec. 13, 1966    2 Sheets-Sheet 1

INVENTOR:
JOHN G. JOHNSON,
BY Robert J. Palmer
ATTORNEY

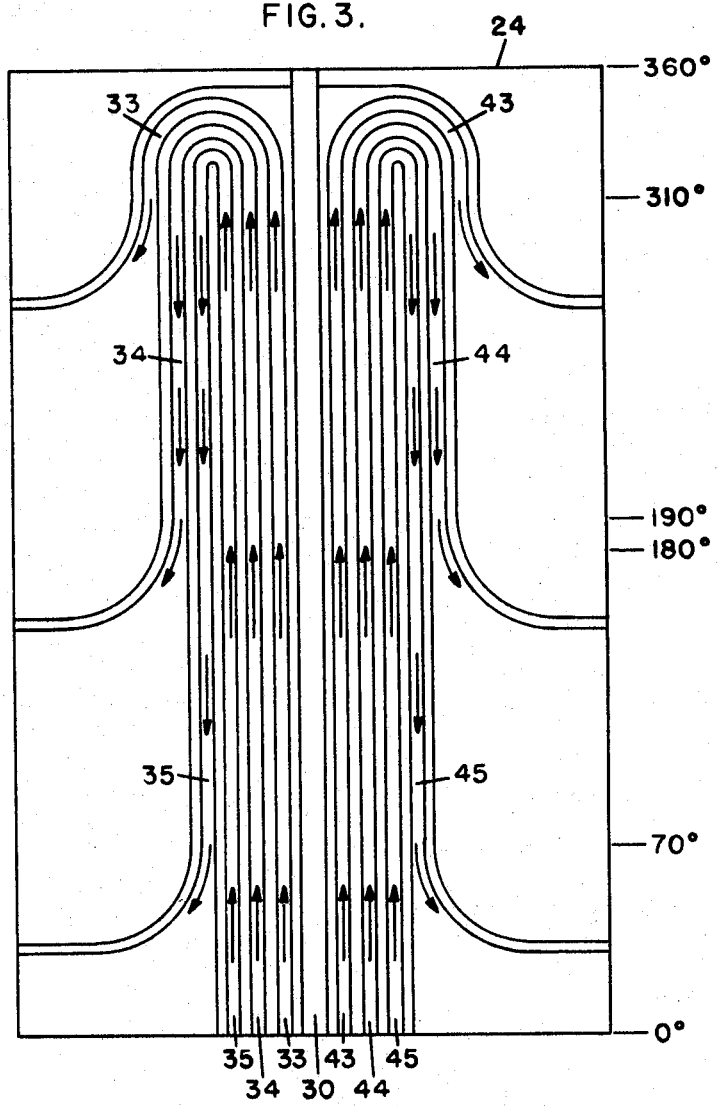

United States Patent Office 3,388,559
Patented June 18, 1968

3,388,559
ELECTRIC MOTORS COOLED WITH REFRIGERANTS
John G. Johnson, Waynesboro, Va., assignor to Westinghouse Electric Corporation, Pittsburgh, Pa., a corporation of Pennsylvania
Filed Dec. 13, 1966, Ser. No. 601,359
15 Claims. (Cl. 62—224)

ABSTRACT OF THE DISCLOSURE

The internal surface of the casing of an electric motor has passages therein between it and the stator of the motor in which a refrigerant is expanded. The refrigerant is discharged from the passages towards the ends of the motor, and flows through the space between the stator and the rotor of the motor into a radially and circumferentially extending passage in the center of the stator, and then through an annular passage in the inner surface of the casing, aligned with the passage in the center of the stator, into a refrigerant outlet opening in the casing.

BACKGROUND OF THE INVENTION

The field of the invention is refrigerant compressor-electric motor units in which the motors are cooled with refrigerant from the compressors.

The U.S. Patents Nos. 2,768,511 and 3,165,905 disclose compressor-motor units with refrigerants from the compressors passing around the ends of the stators and rotors of the motors, and through spaced-apart radial passages in the stators.

SUMMARY OF THE INVENTION

In one embodiment of this invention, the casing of an electric motor has in its internal surface which is around and in contact with its stator, a central annular passage aligned with a radially and circumferentially extending passage in the center of the stator. The inner surface of the casing has on each side of the annular passage, three spaced-apart passages which are connected at corresponding ends through an expansion valve to a condenser of a refrigeration system. The passages to each side of the annular passage extend parallel to the central passage in the stator almost 360°, then are turned 180° and extend parallel to the central passage in the stator almost to their other ends which are spaced apart 120°, and which are flared towards the respective end of the motor. Refrigerant is expanded in the passages to each side of the annular passage, and is discharged therefrom into the spaces at the ends of the stator and the rotor, then passes through the annular space between the rotor and the stator into the central passage in the stator, then into the annular passage, and then from the latter through a refrigerant outlet opening in the casing into a suction gas line connected to the inlet of the refrigerant compressor of the refrigeration system.

Among the advantages of this invention are that there is greatly increased heat exchange contact between the refrigerant and surfaces of the stator and the casing, and the refrigerant in the ends of the motor is more effectively circulated over the end surfaces of the stator, the stator windings, and the rotor.

BRIEF DESCRIPTION OF THE DRAWINGS

FIG. 3 is a view of the inner surface of the motor casing unrolled or developed to show the passages formed therein.

DESCRIPTION OF THE PREFERRED EMBODIMENT

Figure 1:
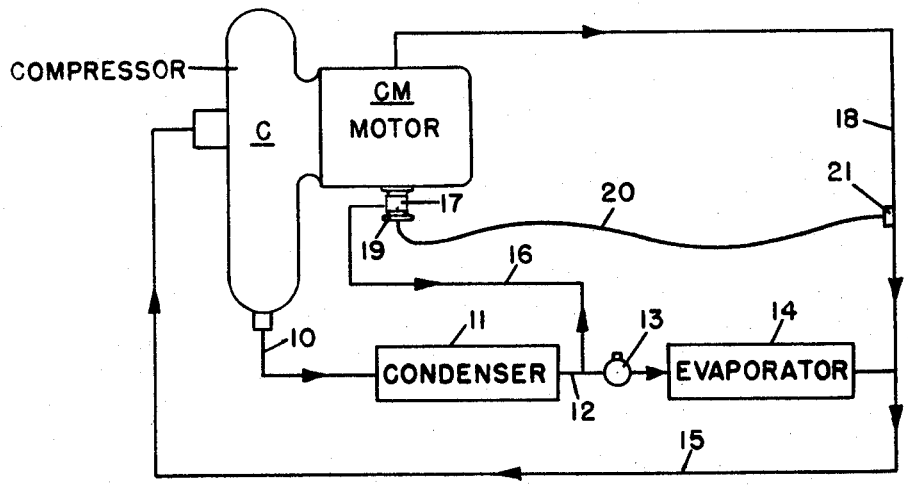
FIG. 1 is a diagrammatic view of a refrigeration system having a compressor driven by an electric motor embodying this invention.

Referring first to FIG. 1, a conventional, centrifugal refrigerant compressor C is driven by an electric motor CM. The outlet of the compressor C is connected by discharge gas line 10 to the inlet of condenser 11, the outlet of which is connected by liquid line 12 and expansion valve 13 to the inlet of evaporator 14, the outlet of which is connected by suction gas line 15 to the inlet of the compressor C. The liquid line 12 is also connected by line 16 to the inlet of thermostatic expansion valve 17, the outlet of which is connected to the interior of the casing of the motor CM. The interior of the casing of the motor CM is connected by suction gas line 18 to the suction gas line 15. The valve 17 has the usual diaphragm chamber 19 connected by capillary tube 20 to thermal bulb 21 in heat exchange contact with the suction gas line 18.

Figure 2:
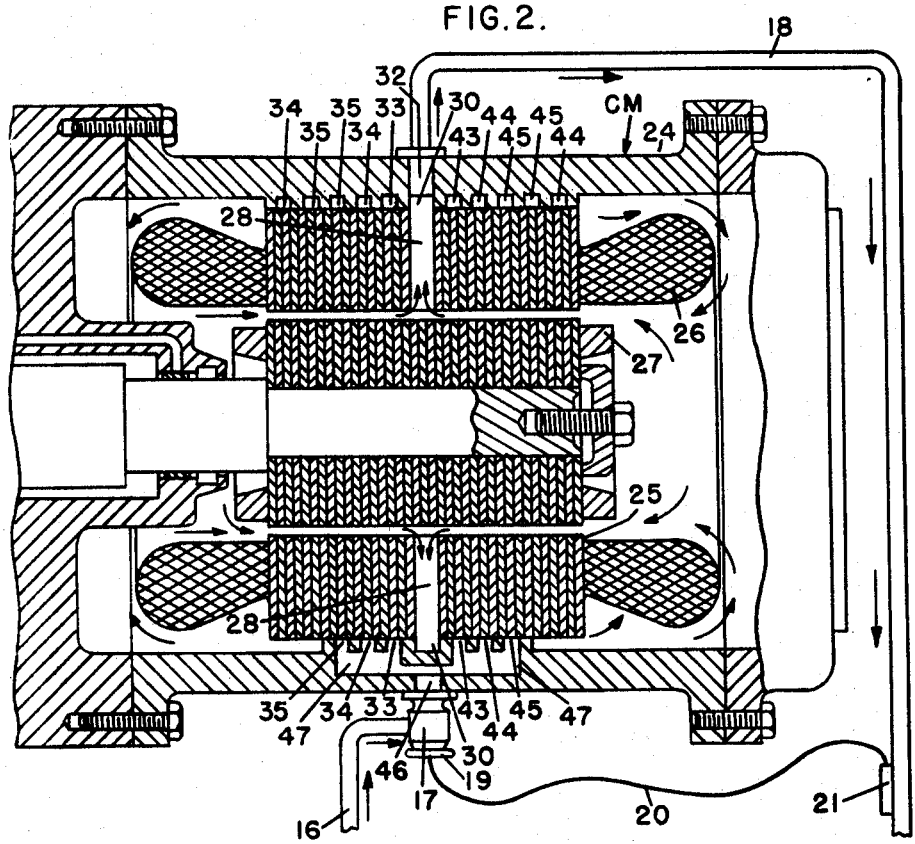
FIG. 2 is an enlarged side section of the motor.

Referring now to FIGS. 2 and 3, the motor CM has a casing with a wall 24 around stator 25 and coils 26 of the latter. The motor CM has a rotor 27 having an outer surface spaced from the inner surface of the stator 25. Portions of the inner surface of the wall 24 contact the outer surface of the stator 25, and between such portions are the passages which will be described in the following. The stator 25 has a central, radially and circumferentially extending passage 28. The inner surface of the wall 24 has an annular passage 30 formed therein aligned with the passage 28. The annular passage 30 connects through an opening 32 in the wall 24 with the suction gas line 18.

At the bottom of FIG. 3 are the 0° positions of the annular passage 30 and of the other passages to be described in the following, and at the top of FIG. 3 is the 360° position of the passage 30. Formed in the inner surface of the wall 24, and spaced to the left (facing FIGS. 2 and 3) of the passage 30 is a passage 33 which extends parallel to the passage 30 to about a 335° position. It then turns 180° and extends parallel to the passage 30 to about a 310° position, and then flares or diverges outwardly towards the left end of the interior of the motor. Formed in the inner surface of the wall 24, and spaced to the left of the passage 33 is a passage 34 which extends parallel to the passage 30 to about a 335° position. It then turns 190° and extends parallel to the passage 30 to about a 190° position, and then flares or diverges outwardly towards the left end of the interior of the motor. Formed in the inner surface of the wall 24, and spaced to the left of the passage 34 is a passage 35 which extends parallel to the passage 30 to about a 335° position. It then turns 180° and extends parallel to the passage 30 to about a 70° position, and then flares or diverges outwardly towards the left end of the interior of the motor.

Formed in the inner surface of the wall 24, and spaced to the right of the passage 30 is a passage 43 which extends parallel to the passage 30 to about a 335° position. It then turns 180° and extends parallel to the passage 30 to about a 310° position, and then flares or diverges outwardly towards the right end of the interior of the motor. Formed in the inner surface of the wall 24, and spaced to the right of the passage 43 is a passage 44 which extends parallel to the passage 30 to about a 335° position. It then turns 180° and extends parallel to the passage 30 to about a 190° position, and then flares or diverges outwardly towards the right end of the interior of the motor. Formed in the inner surface of the wall 24, and spaced to the right of the passage 44 is a passage 45 which extends parallel to the passage 30 to about a 335° position. It then turns 180° and extends parallel to the passage 30 to about a 70° position, and then flares or diverges outwardly towards the right end of the interior of the motor.

The refrigerant outlet ends of the passages 33, 34 and 35 are spaced 120° apart as are the refrigerant outlet ends of the passages 43, 44 and 45.

Referring now to FIG. 2, the outlet of the expansion valve 17 connects through an opening 46 in the bottom of the wall 24 with a passage 47 within the bottom of the wall 24, which connects with the bottoms, which are the 0° positions, of the passages 33, 34, 35, 43, 44 and 45.

OPERATION

In operation, refrigerant supplied from the condenser 11 through the liquid line 12, the expansion valve 17, the opening 46 and the passage 47 in the bottom of the wall 24, into the bottoms of the passages 33, 34, 35, 43, 44 and 45, is expanded within the latter, cooling the inner surface of the wall 24 and the outer surface of the stator 25 by direct contact therewith through large arcs. The refrigerant is then discharged into the ends of the interior of the motor through flared passage outlets spaced 120° apart for uniformly cooling the end surfaces of the stator 25, the stator coils 26, and the rotor 27. The refrigerant then flows through the passage between the rotor and stator into the central passage 28 in the stator 25. The refrigerant then flows from the passage 28 into the annular passage 30, and from the latter, as superheated gas, through the opening 32 in the wall 24, and the suction gas lines 18 and 15 to the inlet of the compressor C.

The expansion valve 17 responds to superheat in the suction gas flowing through the line 18, and is adjusted to maintain a constant degree of superheat.

I claim:

1. A system for cooling an electric motor having a rotor, a stator around said rotor, and a casing having a wall around and with its inner surface in contact with said stator, comprising: the provision of a passage in said inner surface extending more than 180° around said stator; the provision of a refrigerant inlet in said casing connecting with one end of said passage, with the other end of said passage discharging into the interior of said casing; the provision of a refrigerant outlet in said casing; a refrigerant compressor; a condenser; a thermostatic expansion valve; a discharge gas line connecting the outlet of said compressor to one end of said condenser; a liquid line connecting the other end of said condenser to the inlet of said expansion valve, with the outlet of said expansion valve connected to said inlet in said casing; a suction gas line connecting said outlet in said casing to the inlet of said compressor; and means responsive to superheat in the refrigerant gas flowing in said suction gas line for adjusting said expansion valve.

2. A system for cooling an electric motor having a rotor, a stator around said rotor, and a casing having a wall around and with its inner surface in contact with said stator, comprising: the provision of a radially and circumferentially extending passage in the longitudinal center of said stator; the provision of an annular passage in said inner surface aligned with said passage in said stator; the provision in said inner surface of a passage on each side of said annular passage, extending more than 180° around said stator, and having corresponding aligned ends, with their other ends opening into the interior of said casing; the provision of a refrigerant inlet in said casing connecting with said aligned ends; and the provision of a refrigerant outlet in said casing connecting with said annular passage.

3. A system as claimed in claim 2 in which there are provided: a refrigerant compressor; a condenser; a thermostatic expansion valve; a discharge gas line connecting the outlet of said compressor to one end of said condenser; a liquid line connecting the other end of said condenser to the inlet of said expansion valve, with the outlet of said expansion valve connected to said refrigerant inlet in said casing; a suction gas line connecting said refrigerant outlet in said casing to the inlet of said compressor; and means responsive to superheat in the refrigerant gas flowing in said suction gas line for adjusting said expansion valve.

4. A system for cooling an electric motor having a rotor, a stator around said rotor, and a casing having a wall around and with its inner surface in contact with said stator, comprising: the provision of a radially and circumferentially extending passage in the longitudinal center of said stator; the provision of an annular passage in said inner surface aligned with said passage in said stator; the provision in said inner surface of a plurality of spaced apart passages on each side of said annular passage, said passages of said pluralities having aligned corresponding ends, extending from said ends more than 180° around said stator, said passages on each side of said annular passage having different lengths, and having their other ends arranged to discharge into the interior of said casing; the provision of a refrigerant inlet in said casing connected to said corresponding ends; and the provision of a refrigerant outlet in said casing connected to said annular passage.

5. A system as claimed in claim 4 in which said other ends are flared towards the adjacent ends of said casing.

6. A system as claimed in claim 4 in which there are provided: a refrigerant compressor; a condenser; a thermostatic expansion valve; a discharge gas line connecting the outlet of said compressor to one end of said condenser; a liquid line connecting the other end of said condenser to the inlet of said expansion valve, with the outlet of said expansion valve connected to said refrigerant inlet in said casing; a suction gas line connecting said refrigerant outlet in said casing to the inlet of said compressor; and means responsive to superheat in the refrigerant gas flowing through said suction gas line for adjusting said expansion valve.

7. A system as claimed in claim 6 in which said other ends are flared towards the adjacent ends of said casing.

8. A system as claimed in claim 6 in which there are three passages on each side of said annular passage, and having such lengths that their said other ends are spaced 120° apart.

9. A system as claimed in claim 8 in which said other ends are flared towards the adjacent ends of said casing.

10. A system as claimed in claim 4 in which there are three passages on each side of said annular passage, and having such lengths that their said other ends are spaced 120° apart.

11. A system as claimed in claim 10 in which said other ends are flared towards the adjacent ends of said casing.

12. A system as claimed in claim 10 in which the one of said three passages on each side of said annular passage that is closest to said annular passage is the longest, and the one which is furtherest from said annular passage is the shortest, in which said passages on each side of said annular passage extend parallel to said annular passage through more than 180°, and then turn 180° and extend parallel to said annular passage to their said other ends.

13. A system as claimed in claim 12 in which said other ends are flared towards the adjacent ends of said casing.

14. A system as claimed in claim 12 in which there are provided: a refrigerant compressor; a condenser; a thermostatic expansion valve; a discharge gas line connecting the outlet of said compressor to one end of said condenser; a liquid line connecting the other end of said condenser to the inlet of said expansion valve, with the outlet of said expansion valve connected to said refrigerant inlet in said casing; a suction gas line connecting said refrigerant outlet in said casing to the inlet of said compressor; and means responsive to superheat in the refrigerant gas flowing through said suction gas line for adjusting said expansion valve.

15. A system as claimed in claim 14 in which said other ends are flared towards the adjacent ends of said casing.

References Cited
UNITED STATES PATENTS

| | | | |
|---|---|---|---|
| 2,891,391 | 6/1959 | Kocher | 62—505 XR |
| 3,146,605 | 9/1964 | Rachfal | 62—197 |
| 3,217,193 | 11/1965 | Rayner | 310—54 |
| 3,218,825 | 11/1965 | McClure | 62—505 |

MEYER PERLIN, *Primary Examiner.*